US009573206B2

(12) United States Patent
Lokkinen

(10) Patent No.: US 9,573,206 B2
(45) Date of Patent: Feb. 21, 2017

(54) DEVICE AND SYSTEM FOR CUTTING PIPE FROM INSIDE

(71) Applicant: Picote Oy Ltd., Porvoo (FI)

(72) Inventor: Mika Lokkinen, Tallinn (EE)

(73) Assignee: PICOTE Oy LTD., Porvoo (FI)

( * ) Notice: Subject to any disclaimer, the term of this patent is extended or adjusted under 35 U.S.C. 154(b) by 0 days.

(21) Appl. No.: 14/902,854

(22) PCT Filed: Jul. 4, 2014

(86) PCT No.: PCT/FI2014/050557
§ 371 (c)(1),
(2) Date: Jan. 5, 2016

(87) PCT Pub. No.: WO2015/001193
PCT Pub. Date: Jan. 8, 2015

(65) Prior Publication Data
US 2016/0151843 A1 Jun. 2, 2016

(30) Foreign Application Priority Data

Jul. 5, 2013 (FI) ...................................... 20135740

(51) Int. Cl.
| | |
|---|---|
| *B23D 21/14* | (2006.01) |
| *B26D 3/16* | (2006.01) |
| *B24B 27/033* | (2006.01) |
| *B24B 29/08* | (2006.01) |
| *B24B 5/36* | (2006.01) |
| *B24B 5/40* | (2006.01) |

(52) U.S. Cl.
CPC .............. *B23D 21/14* (2013.01); *B24B 5/363* (2013.01); *B24B 5/40* (2013.01); *B24B 27/033* (2013.01); *B24B 29/08* (2013.01); *B26D 3/163* (2013.01)

(58) Field of Classification Search
CPC ........... B23D 21/14; B24B 5/363; B24B 5/40; B24B 27/033; B26D 3/163
USPC ........................................... 83/185, 187, 191
See application file for complete search history.

(56) References Cited

U.S. PATENT DOCUMENTS

| | | | | |
|---|---|---|---|---|
| 3,283,405 | A | * 11/1966 | Braswell ............... | E21B 29/005 30/103 |
| 3,911,574 | A | * 10/1975 | Jones ..................... | B23D 21/14 30/103 |
| D273,194 | S | * 3/1984 | House ................... | B23D 21/14 D15/139 |
| 5,403,120 | A | 4/1995 | Stekette, Jr. | |
| 5,499,453 | A | * 3/1996 | Brauchitsch ............ | E03D 11/17 30/103 |

(Continued)

FOREIGN PATENT DOCUMENTS

| | | |
|---|---|---|
| FI | 9377 | 9/2011 |
| JP | H06170636 | 6/1994 |

(Continued)

*Primary Examiner* — Omar Flores Sanchez
(74) *Attorney, Agent, or Firm* — Fasth Law Offices; Rolf Fasth

(57) ABSTRACT

A device used for cutting a pipe from an inside. The device has a spindle arranged to be rotated. The device further has protrusions fastened to the spindle and arranged to position the device or a part of the device inside the pipe. The protrusions have at least one blade arranged to machine material off the inner surface of the pipe to cut the pipe while the spindle is being rotated.

9 Claims, 4 Drawing Sheets

(56) References Cited

U.S. PATENT DOCUMENTS 6,467,121 B1    10/2002   Franzino

FOREIGN PATENT DOCUMENTS

| WO | 2010125238 | 11/2010 |
| WO | 2013079799 | 6/2013 |

* cited by examiner

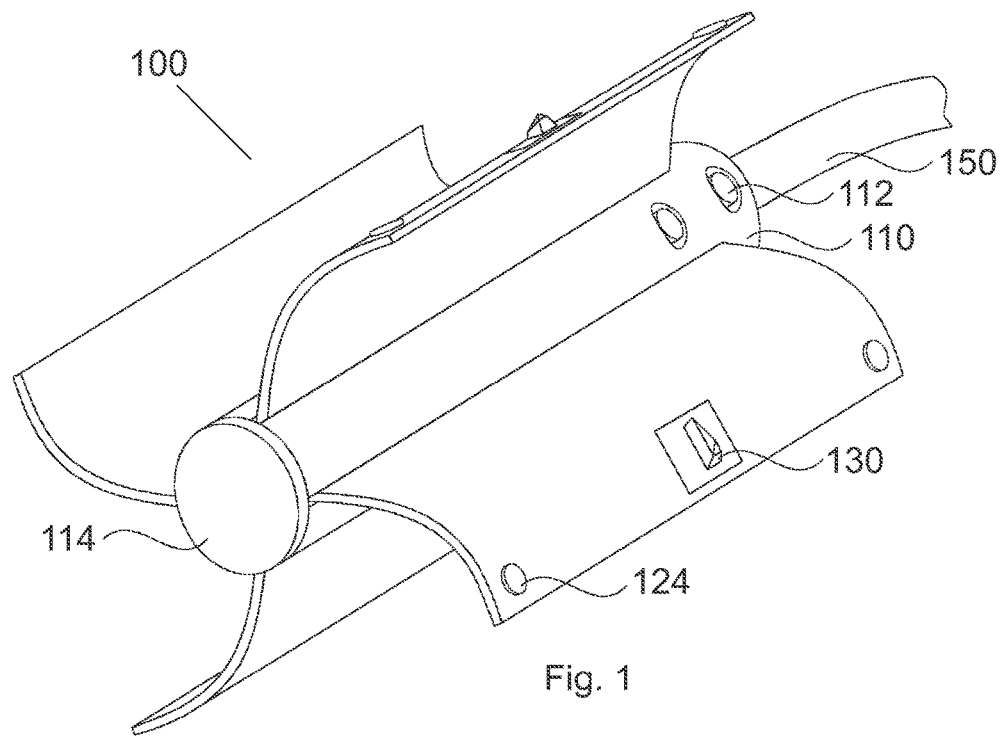
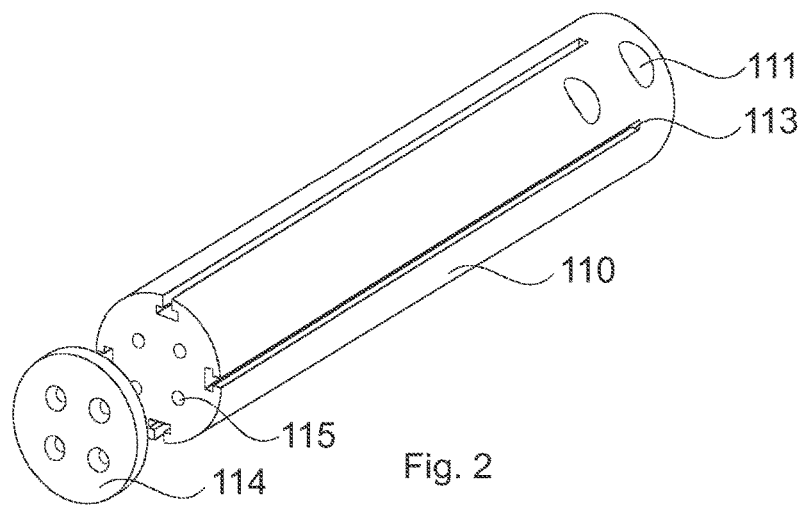

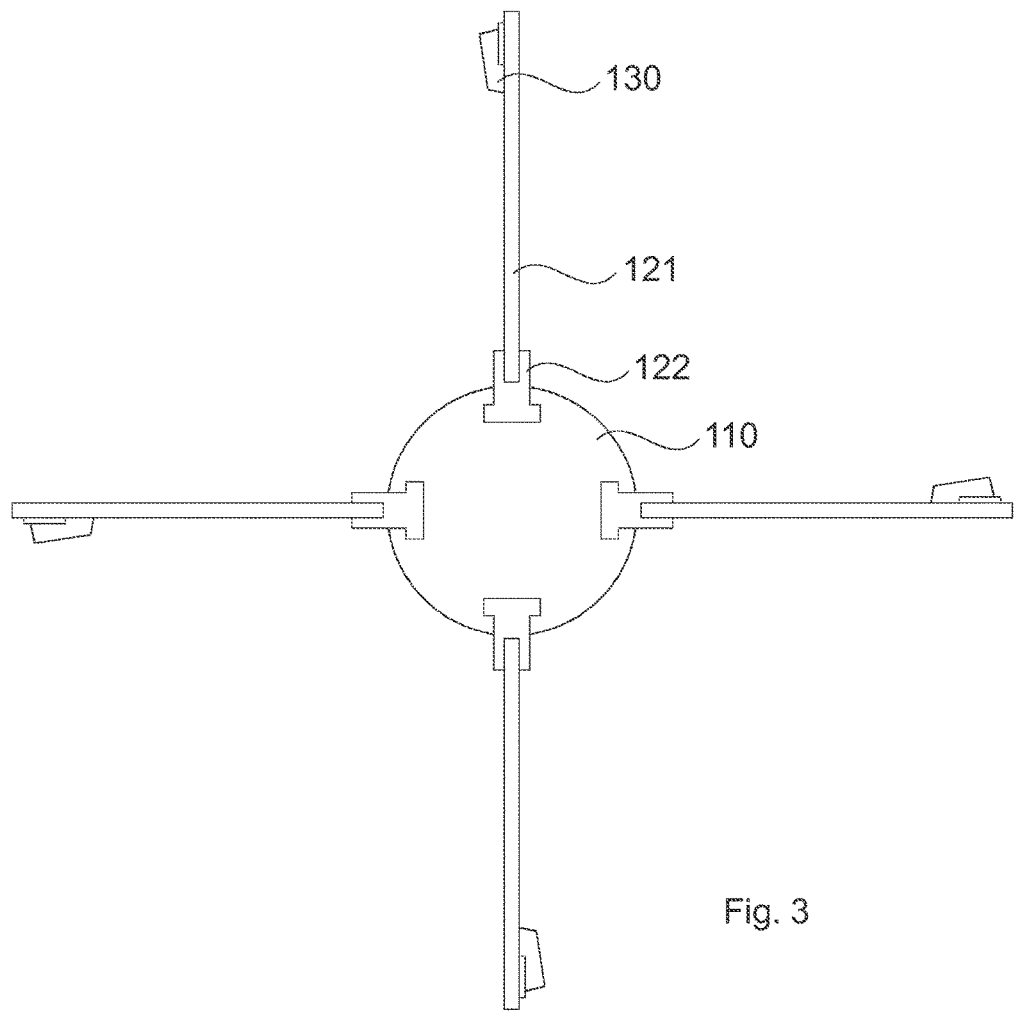
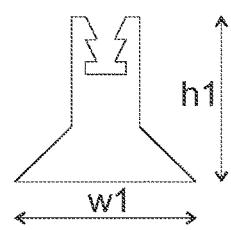
Fig. 4a
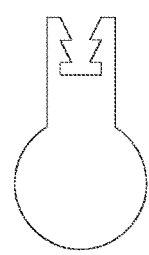
Fig. 4b
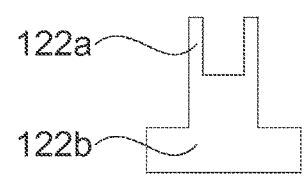
Fig. 4c

DEVICE AND SYSTEM FOR CUTTING PIPE FROM INSIDE

PRIOR APPLICATIONS

This is a U.S. national phase patent application that claims priority from PCT/FI2014/050557 filed 4 Jul. 2014, that claims priority from Finnish Patent Application No. 20135740, filed 5 Jul. 2013.

BACKGROUND OF THE INVENTION

The invention relates to a device and a system suitable for cutting a pipe, for example a liner installed inside a sewage pipe, and to use thereof for cutting a pipe from inside the pipe.

In prior art solutions, inner surfaces of sewage pipes have been machined from inside the pipe by means of grinding robots, for example. The robot may have a spherical blade attached to the end of an arm, for example, which blade, while rotating, grinds the inner wall of the pipe and can be controlled by appropriate control devices. The grinding blade is operated by a pneumatic motor, for instance. Due to the low torque generated by pneumatic operation, the speed of rotation required for the grinding blade may be very high, for example 10 000 to 30 000 rpm. The robot is pushed to the cutting point inside the pipe by means of rigid push bars.

A problem with prior art solutions is that the machining is slow and susceptible to errors. For instance, an incorrect control command to the robot may damage not only the pipe to be machined but also another pipe that surrounds the pipe to be machined. Further, it is often difficult to move the grinding robot inside a sewage pipe, possibly through a plurality of sharp turns, to the desired location. Proceeding through turns is not always successful, so the grinding robot must often be operated from the pipe end different from the one through which the coating was applied, in which case it may be necessary, for instance, to open the gully hole in the street and close the street to traffic for the duration of machining.

BRIEF DESCRIPTION OF THE INVENTION

An object of the invention is thus to provide a device and a system in such a way that the above-mentioned problems can be solved. The object of the invention is achieved by a system and a device which are characterised by what is disclosed in the independent claims. Preferred embodiments of the invention are disclosed in the dependent claims.

The invention is based on the idea that the device comprises a spindle which may be provided with flexible protrusions or strips that can be pressed to fold against the spindle when the device is taken into the pipe. While the spindle is being rotated, for example with a drilling machine via a cable, the strips press against the inner wall of the pipe. A blade is attached to the strips, so at a given point in the pipe, the blades of the rotating device machine material off the inner wall of the pipe and finally cut the pipe.

An advantage of the method and the system according to the invention is that the device can be pushed even in a pipe that winds and even long distances to the desired cutting point, and the pipe can be cut quickly and easily.

BRIEF DESCRIPTION OF THE DRAWINGS

The invention is now described in more detail in connection with preferred embodiments and with reference to the accompanying drawings, of which:

FIG. 1 shows a device according to an embodiment of the invention for cutting a pipe from the inside;

FIG. 2 shows a spindle in a device according to an embodiment of the invention;

FIG. 3 shows a cross-section of a device according to an embodiment of the invention, seen from the direction of the spindle axis;

FIGS. 4*a*, 4*b* and 4*c* show examples of support profiles according to some embodiments;

DETAILED DESCRIPTION OF THE INVENTION

Figure 5:
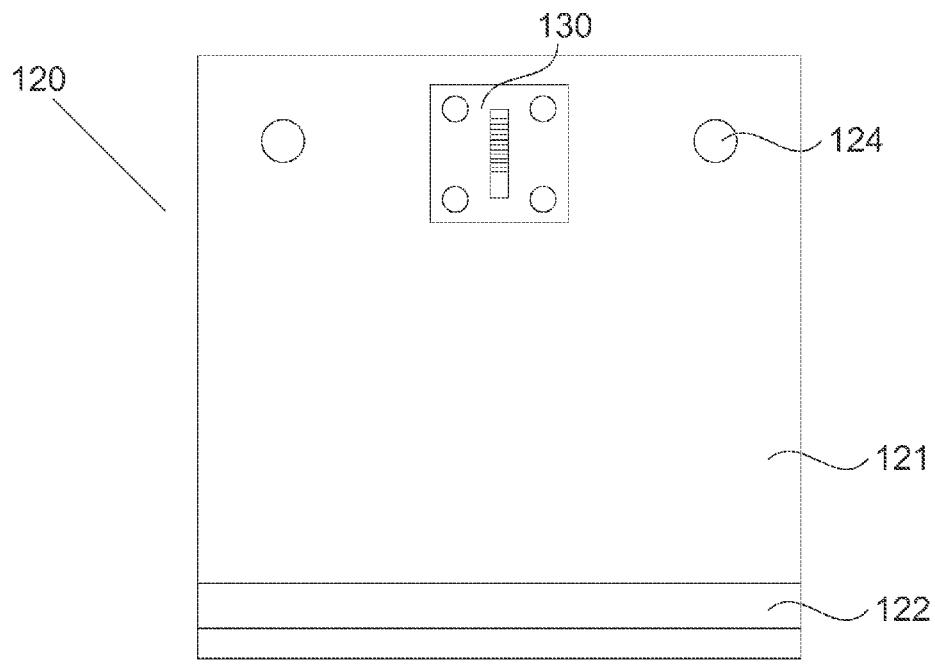
FIG. 5 shows a protrusion according to an embodiment of the invention.

FIG. 1 shows a device 100 in accordance with an embodiment of the invention. FIG. 2 shows a spindle 110 of a device in accordance with an embodiment of the invention without protrusions fastened to it. The device comprises a spindle 110 with a set of protrusions 120 fastened radially to it. The protrusions preferably comprise a support profile 122 that can be fastened to the spindle 110, and an elastic and/or flexible strip 121 fastened to the support profile 122. The protrusions are preferably arranged on different sides of the spindle and symmetrically to its rotation axis. One task of the protrusions is to position the spindle by centring it, for example, inside a pipe of a pipe assembly and to keep the longitudinal axis of the spindle 110 parallel to the longitudinal axis of the pipe. The protrusions 120 may be fastened to grooves 113, for instance, by means of fastening screws. A flexible cable 150 is fastened to the spindle by means of fastening means 112, one end (not shown in the figure) of which cable may be provided with a device rotating a machining device, for example a motor that rotates the machining device at a suitable speed. The fastening means 112 may be screws, bolts, rivets, or wedges, for instance, with which the cable 150 is fastened to the spindle 110 by means of openings 111. In a preferred embodiment, the rotation speed of the spindle may be 1 000 to 4 000 rpm, for example.

In an embodiment, the protrusions 120 comprise rubber or some other elastic material that may be reinforced with Kevlar, fabric, or some other textile or reinforcement that improves the strength of the protrusion against tearing, for example. In an embodiment, the protrusions are rubber strips inside which there is a fabric reinforcement. Since the elastically flexible protrusions that are identical with each other are, in this embodiment, positioned symmetrically on different sides of the spindle, the protrusions always centre the spindle together in the middle of the particular pipe that is to be machined with the device.

The protrusions 120 comprise at least one blade 130 for machining material off the inner surface of the pipe to cut the pipe. While the spindle 110 is being rotated, the protrusions 120 bend and the blades 130 in the vicinity of the outer edge of the protrusions hit the inner surface of the pipe. Preferably, each protrusion has one blade at substantially the same point of the protrusion, whereby each blade machines the same cutting mark inside the pipe if the spindle is being rotated in place in the pipe. In an embodiment, one protrusion may have a plurality of blades, for instance two or three blades, or some of the protrusions may be without blades, in which case they merely balance the device. With regard to its operating principle, the blade 130 may be cutting, abrasive, grinding or sawing.

Figures 6, 7:
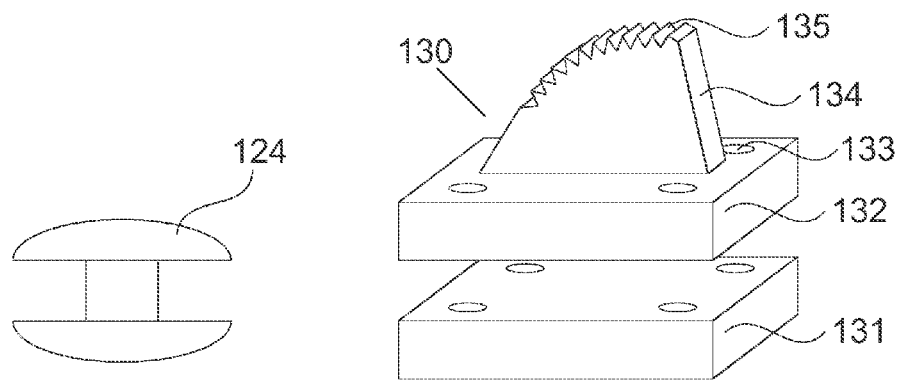
FIG. 6 shows a sliding surface according to an embodiment of the invention.
FIG. 7 shows a blade according to an embodiment of the invention.

In an embodiment, the protrusion may comprise one or more sliding surfaces 124. The sliding surface is preferably elevated from the surface of the strip 121. The friction coefficient between the sliding surface 124 and the inner surface of the pipe is lower than that between the strip and the inner surface of the pipe. When the protrusion comprises a rubber strip, the friction between the rubber strip and the inner surface of the pipe may hinder the rotation of the spindle and unduly heat up the pipe and the rubber strip. In cases like this, in particular, it is preferable to use a sliding surface 124 which slides against the inner surface of the pipe and thus keeps the rubber strip off the inner surface of the pipe. The sliding surface 124 may be formed by means of, for instance, a metal rivet fastened through the protrusion or the strip and being preferably rounded on the side that is arranged to be in contact with the inner surface of the pipe. FIG. 6 shows a sliding surface according to an embodiment, and its rivet-like structure with which the sliding surface 124 can be fastened to the strip 121. In an embodiment, the sliding surface is implemented with a pin or bulge attached to the strip. The sliding surface is preferably of metal, nylon or Teflon. In an embodiment, the sliding surface is a coating on the surface of the strip of the protrusion.

FIG. 3 shows a cross-section of a device in accordance with an embodiment of the invention, seen from the direction of the rotation axis of the spindle 110. The figure clearly shows the strips 121 attached to the spindle 110 with support profiles 122. FIGS. 4a, 4b and 4c show some examples of alternative embodiments for support profiles of a grinding member. FIG. 5 shows a protrusion 120 in accordance with an embodiment, comprising an elongated support profile 122 and an elastic strip 121 attached to the support profile 122. The strip 121 is provided with two sliding surfaces 124 and a blade 130. The support profile 121 comprises, in the embodiment of FIG. 4c, an upper portion 122a with a rectangular cross-section, having a slot extending downwards from the upper surface of the upper portion, and a lower portion 122b with a rectangular cross-section. The slot extending downwards from the upper surface of the upper portion 122a of the support profile 122 is provided with the strip 121 preferably with crimp connection by one of its edges. The cross-section of the support profile 122 has a height direction h1 and a width direction w1. The greatest dimension of the cross-section of the lower portion 122b of the support profile 122 in the width direction w1 is greater than the corresponding dimension of the upper portion 122a. In this way, the support profile 122 becomes locked in the groove 113 in the spindle 110 against radial and circumferential movement when the support profile 122 is pushed into the groove 113 from one of the end surfaces of the spindle 110. In an embodiment, the spindle 110 has open grooves 113 only at one end, in which case the grooves do not extend from end to end in the spindle 110, as shown in FIG. 2. At the end of the spindle 110 having the open grooves, an end piece 115 is used which may be fastened to threaded screw holes 115 at the end of the spindle 110 with screws, for example. Preferably, the threading in the screw holes 115 does not extend quite to the end of the spindle 110, whereby it is easier to place all screws of the end piece 114 simultaneously on the threads.

FIGS. 4a, 4b and 4c show three alternative embodiments for the support profile. In all embodiments shown in FIGS. 4a to 4c, the upper portion 122a of the support profile is in the shape of a rectangle having a slot for a strip. In FIGS. 4a and 4b, the slot has toothing which prevents the strip from sliding out of the slot after the crimp connection has been made. In the embodiment of FIG. 4a the cross-section of the lower portion 122b of the support profile 122 is trapezoidal, in FIG. 4b circular and in FIG. 4c rectangular. In the embodiments shown in FIGS. 4a, 4b and 4c, the greatest dimension of the cross-section of the lower portion 122b of the support profile 122 in the width direction w1 is greater than the corresponding dimension of the upper portion 122a. The cross-section of the support profile 122 may be whichever, but it must have at least one portion the greatest dimension of which in the width direction w1 is greater than the corresponding dimension of the upper portion 122a above it in order for the support profile 122 to become locked in the corresponding groove 113 in the spindle 110 against radial and circumferential movement of the spindle 110.

FIG. 5 shows a protrusion 120 according to an embodiment of the invention. The protrusion 120 comprises a support profile 122 and a strip 121 connected with crimp connection to the slot of the support profile 122. The strip 121 is provided with two sliding surfaces 124 in the vicinity of the outer corners in relation to the support profile, and a blade 130 at the middle point of the opposite strip 121 side in relation to the support profile 122. Changing the specific weight, size or mass of the strip 121 enables changing the force with which the blade 130 presses against the inner surface of the pipe. The rotation speed of the spindle 110 also influences the magnitude of this force. If a strip made of the same material and having a standard thickness is always used, the strip height extending away from the support profile 122 and the strip length in the direction of the support profile 122 allow the mass of the strip 121 to be changed, whereby the blade 130 can be made bite into the inner surface of the pipe either more efficiently if the mass is to be increased or more weakly if the mass is to be decreased. The strip height cannot be increased very much because the strip 121 must not extend onto the blade 130 of the adjacent strip where it would prevent the blade from machining the inner surface of the pipe while the device is rotating in the pipe. By contrast, the length of the strip 121 can be increased according to the need, whereby the flexibility of the strip is to be taken into account and, if required, more sliding surfaces are to be added in the vicinity of the edge opposite the support profile 122 of the strip 121 in order for the surface of the strip 121 not to hit the inner surface of the pipe to be machined while the spindle 110 is being rotated, which would slow down the rotary motion.

FIG. 7 shows a blade 130 according to an embodiment of the invention. The blade according to the embodiment comprises a cutting head 134 on a bottom plate 132, and a machining surface 135 in the cutting head. The cutting head 134 determines the cutting depth of the blade 130, and changing the height of the cutting head 134 from the bottom plate 132 allows the cutting depth to be changed. With regard to its operating principle, the blade 130 may be cutting, abrasive, grinding or sawing. The machining surface 135 of the cutting head 134 of the blade 130 may be serrated, wedge-shaped or roughened.

In an embodiment, the bottom plate 132 and the cutting head 134 are formed of one piece. In an embodiment, the bottom plate 132 and the cutting head 134 are welded together. In an embodiment, the bottom plate 132 has an opening through which the upper part of the cutting head 134 fits, and the cutting head 134 has a lower part which is wider and/or longer than the upper part and does not fit through the opening in the bottom plate, whereby the lower part of the cutting head 134 keeps the cutting head attached to the bottom plate 132 when the blade 130 is fastened to the strip. Detaching the blade from the strip allows the cutting head 134 to be removed from the bottom plate 130 and the cutting head 134 to be replaced with a new one or one of a different shape. The blade 130 can be fastened to the strip 121 by using a base plate 131 on the other side of the strip, whereby the blade 130 can be fastened to the strip 121 by placing the strip 121 between the bottom plate 132 of the blade and the base plate 131 and by means of openings 133, thereby joining the base plate 131, the strip 121 and the bottom plate 132 to each other, for instance with screws, bolts and nuts or rivets. In an embodiment, the strip 121 is reinforced in such a way that using a base plate 131 is not necessary, in which case the strip can be directly provided with fastening points corresponding to the openings 133 of the bottom plate 132, and the bottom plate 132 can be directly fastened to the strip 121 for instance with screws, bolts and nuts or rivets.

Figure 8:
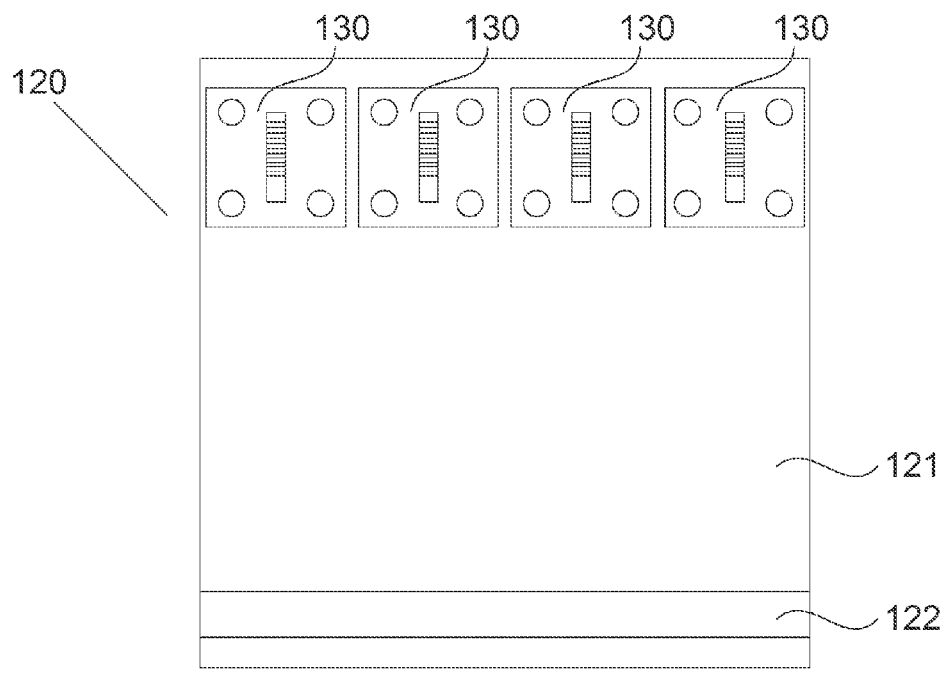
FIG. 8 shows a protrusion according to an embodiment of the invention.

FIG. 8 shows a protrusion 120 according to an embodiment, which protrusion is particularly suitable for grinding a pipe from the inside. By using protrusions according to the embodiment in connection with the device, the device can be easily used for grinding off the inner pipe, such as a resin-impregnated renovation lining, from a pipe arrangement formed of, for example, two pipes within each other, such as metal pipes renovated with lining technique. The protrusion 120 comprises a support profile 122 and a strip 121 connected with crimp connection to the slot of the support profile 122. The strip 121 is provided with four blades 130 in a row on the opposite side of the strip 121 relative to the support profile 122. In an embodiment, there are one to ten blades 130, preferably two, three, four, five or six blades in one strip 121. In an embodiment, there are several cutting heads 134 arranged in one bottom plate 132 of the blade 130, for instance two, three, four or five cutting heads. In an embodiment, in each of the protrusions 120 fastened to one spindle 110, for example in each of the four protrusions, the blades 130 or the cutting heads 134 of the blades are arranged at slightly different points in the strip 121. Preferably, the blades 130 are arranged in the protrusions 120 in such a way that while the spindle 110 is rotating, the cutting heads 134 of the blades cover as large an area as possible of the inner surface of the pipe to be machined.

Figures 9A, 9B:
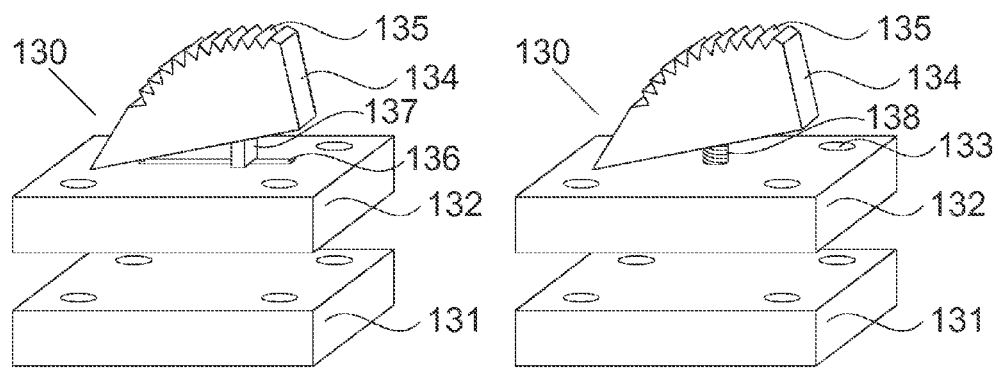
FIGS. 9*a* and 9*b* show examples of adjustable blades according to some embodiments.

FIGS. 9a and 9b show examples of blades 130 according to some embodiments, the blades having an adjustable cutting depth. The blade according to the embodiment of FIG. 9a comprises a cutting head 134 on the bottom plate 132, and a machining surface 135 in the cutting head. The cutting head 134 determines the cutting depth of the blade 130, and changing the height of the cutting head 134 from the bottom plate 132 allows the cutting depth to be changed. The height of the cutting head 134 from the bottom plate can be changed by moving a support 137 along a groove 136 arranged in the bottom plate. The support can be fastened in place for instance with a screw which is arranged in the lower surface of the bottom plate and tightens the support 137 in place in the groove 136. One end of the cutting head is operationally, for example hingedly, fastened to the bottom plate while the other end of the cutting head is arranged to be movable. With regard to its operating principle, the blade 130 may be cutting, abrasive, grinding or sawing. The machining surface 135 of the cutting head 134 of the blade 130 may be serrated, wedge-shaped or roughened.

The blade according to the embodiment of FIG. 9b comprises a cutting head 134 on the bottom plate 132, and a machining surface 135 in the cutting head. The cutting head 134 determines the cutting depth of the blade 130, and changing the height of the cutting head 134 from the bottom plate 132 allows the cutting depth to be changed. One end of the cutting head is operationally, for example hingedly, fastened to the bottom plate while the other end of the cutting head is arranged to be movable. The height of the cutting head 134 from the bottom plate can be changed by rotating a threaded adjuster 138 arranged in the bottom plate 132, whereby the adjuster either pushes the end of the cutting head 134 that is arranged to be movable away from the bottom plate or, when rotated in the other direction, allows the end of the cutting head 134 that is arranged to be movable to be lowered closer to the bottom plate. The adjuster 138 may be, for example, a screw or a bolt arranged in the bottom plate 132 in such a way that the head of the screw or bolt is reachable either from the upper side of the bottom plate where the cutting head is positioned, or from the lower side of the bottom plate, positioned against the strip 121 when the blade is fastened to the strip. With regard to its operating principle, the blade 130 may be cutting, abrasive, grinding or sawing. The machining surface 135 of the cutting head 134 of the blade 130 may be serrated, wedge-shaped or roughened.

It will be apparent to a person skilled in the art that as technology advances. the basic idea of the invention may be implemented in many different ways. The invention and its embodiments are thus not restricted to the examples described above but may vary within the scope of the claims.

While the present invention has been described in accordance with preferred compositions and embodiments, it is to be understood that certain substitutions and alterations may be made thereto without departing from the spirit and scope of the following claims.

The invention claimed is:

1. A device for cutting a pipe from inside, comprising: a spindle arranged to be rotated, protrusions fastened to the spindle and arranged to position the device or a part of the device inside the pipe, the protrusions comprising at least one blade arranged to machine material off an inner surface of the pipe to cut the pipe while the spindle is being rotated, the protrusion comprises a strip generating an elastic force when being bent, the strip further comprises at least one sliding surface for keeping the strip off a pipe wall, a friction coefficient between the sliding surface and the inner surface of the pipe being lower than a friction coefficient between the strip and the inner surface of the pipe.

2. The device according to claim 1, wherein the protrusion is arranged to be supported to the pipe by an elastic force.

3. The device according to claim 1, wherein the strip comprises at least one of the following materials: fabric, textile and rubber.

4. The device according to claim 1 wherein a cutting depth of the blade is arranged to correspond to a wall thickness of the pipe to be cut, the device is arranged to cut only an inner pipe out of a pipe assembly formed of two pipes within each other.

5. The device according to claim 1, wherein the protrusion comprises an elongated support profile, a cross-section of the support profile comprising a height direction (h1) and a width direction (w1), the cross-section of the support profile has at least one portion having a greatest dimension of which in the width direction (w1) is greater than a corresponding greatest dimension that an uppermost portion positioned above the at least one portion in the height direction (h1) has in the width direction (w1), the support profile is locked in a groove having a corresponding cross-section.

6. The device according to claim 1, wherein the spindle comprises at least one groove formed on an outer circumference of the spindle, a cross-sectional shape of the groove corresponding to a cross-sectional shape of a support profile of the protrusion, the support profile of the protrusion being pushable from an end surface of the spindle into the at least one groove on the outer circumference of the spindle, in which groove the support profile is arranged to be locked.

7. The device according to claim 5, wherein the protrusion comprises an elastic strip fastened to the uppermost portion in the height direction (h1) of the cross-section of the support profile and protruding from an upper surface of the support profile.

8. The device according to claim 5 wherein the elastic strip is fastened by one of edges of the elastic strip with crimp connection to the uppermost portion in the height direction (h1) of the cross-section of the support profile.

9. A device for cutting a pipe from inside, comprising: a spindle arranged to be rotated, protrusions fastened to the spindle and arranged to position the device or a part of the device inside the pipe, the protrusions comprising at least one blade arranged to machine material off an inner surface of the pipe to cut the pipe while the spindle is being rotated, the protrusion comprises a strip generating an elastic force when being bent, the strip further comprises at least one sliding surface for keeping the strip off a pipe wall.

* * * * *